United States Patent
D'Angelo et al.

(10) Patent No.: US 7,080,266 B2
(45) Date of Patent: Jul. 18, 2006

(54) SINGLE WIRE NETWORK FOR SENDING DATA IN PREDETERMINED PERIODS AND NEXT REGISTER ADDRESS IMMEDIATELY THEREAFTER AND STORING DATA IN REGISTER IDENTIFIED IN LAST CYCLE

(75) Inventors: Kevin P. D'Angelo, Santa Clara, CA (US); David J. Oldham, San Jose, CA (US)

(73) Assignee: Advanced Analogic Technologies, Inc, Sunnyvale, CA (US)

( * ) Notice: Subject to any disclaimer, the term of this patent is extended or adjusted under 35 U.S.C. 154(b) by 475 days.

(21) Appl. No.: 10/447,764

(22) Filed: May 29, 2003

(65) Prior Publication Data

US 2003/0212918 A1    Nov. 13, 2003

Related U.S. Application Data

(63) Continuation-in-part of application No. 10/144,333, filed on May 13, 2002.

(60) Provisional application No. 60/456,490, filed on Mar. 19, 2003.

(51) Int. Cl.
*G06F 1/22* (2006.01)
(52) U.S. Cl. ........................ 713/300; 713/320; 713/330
(58) Field of Classification Search ................ 713/500, 713/501, 502, 503, 300, 320, 330
See application file for complete search history.

(56) References Cited

U.S. PATENT DOCUMENTS

| | | | |
|---|---|---|---|
| 5,593,430 A * | 1/1997 | Renger | 607/18 |
| 6,249,480 B1 * | 6/2001 | Mick | 365/233 |
| 6,950,440 B1 * | 9/2005 | Conway | 370/458 |
| 2003/0188202 A1 * | 10/2003 | D'Angelo et al. | 713/300 |
| 2003/0212918 A1 * | 11/2003 | D'Angelo et al. | 713/500 |
| 2005/0169345 A1 * | 8/2005 | Urbas et al. | 374/100 |

* cited by examiner

*Primary Examiner*—Chun Cao
*Assistant Examiner*—Malcolm Cribbs
(74) *Attorney, Agent, or Firm*—Joseph Hollinger

(57) ABSTRACT

A device control protocol (and related implementation) is provided to control power ICs and other devices. For this protocol, a master device communicates with a slave device using a single wire. The device control protocol distinguishes between different types of information (such as register address information and register content information) by defining one or more boundary values. For one example, register content information is defined to be less than or equal to n. Register address information is defined to be more than n. To store data into a register of a slave device, a master device sends the register address using more than n rising edges of the EN/SET signal. The master device then sends the register contents using n or less rising edges of the EN/SET signal. The slave device decodes the address information, selects the corresponding register and stores the register contents.

16 Claims, 4 Drawing Sheets

US 7,080,266 B2

SINGLE WIRE NETWORK FOR SENDING DATA IN PREDETERMINED PERIODS AND NEXT REGISTER ADDRESS IMMEDIATELY THEREAFTER AND STORING DATA IN REGISTER IDENTIFIED IN LAST CYCLE

RELATED APPLICATIONS

This application is a continuation in part of the U.S. Provisional Application Ser. No. 10/144,333 entitled "Single Wire Serial Interface" filed May 13, 2002. This application was provisionally filed as U.S. Provisional Patent Application Ser. No. 60/456,490 entitled "Single Wire Serial Interface with Addressing, Io, and Multiplexing Capability" filed Mar. 19, 2003. The disclosure of both of these applications is incorporated in this document by reference.

TECHNICAL FIELD OF THE INVENTION

The present invention relates generally to control interfaces for integrated circuits and other devices. More particularly, the present invention includes a device control protocol (and related implementation) that may be used to control power ICs and other devices.

BACKGROUND OF THE INVENTION

Power control is an important consideration in the design of electronic devices of all types. This is particularly true for portable electronic devices, such as cellular telephones, personal digital assistants and digital cameras. Designers of these devices are faced with the need to continuously increase battery life while continuously increasing the range and type of functions provided. This is dramatically illustrated by the continuing evolution of cellular telephones. Originally equipped with large batteries that provided minutes of operation, cellphones have evolved to the point where a small battery (smaller than the phone in almost all cases) provides days of operation. At the same time, cellphones have continued to become more feature packed to the point that many now include formerly unrelated devices such as digital cameras or PDAs.

To control power, portable electronic devices typically include specialized integrated circuits generally referred to as power control ICs. Different power control ICs are available to function as voltage regulators, current sources and switches. In portable electronic devices, power control IC's are used to operate a wide range of subsystems such as LCDs, LEDs, speakers, and motors. In many cases, power control ICs are implemented as discrete, standalone devices with the result that a single electronic device (e.g., cellphone) may include a large number of different power control ICs. In such cases, controlling the different ICs becomes a significant problem.

Part of this problem is attributable to the fact that small, discrete integrated circuits typically have a very small number of input/output leads. Almost by definition, use of any of these leads for control reduces the number of leads available for other purposes. This is especially problematic for ICs that have complex control interfaces, such as multi-bit control registers. Of course, even where adequate leads are available, routing large numbers of control signals adds cost and complexity to portable electronic devices. In the competitive world of consumer electronics, this can be a serious disadvantage.

In some cases, it is possible to use analog signals to reduce the number of leads required for control purposes. This is particularly true where a function or output is controlled over a range of values (such as a voltage output). In cases of this type, a single analog input can be used to control the function or output. Unfortunately, the use of analog signally is inherently error prone and not always easy to calibrate. It is also true that many microprocessors lack analog outputs, making implementation of analog control signals even more difficult.

Digital control systems are also possible, and may be implemented to pass data serially or in parallel. The digital nature of these systems increases their compatibility with microprocessors. However, even serial implementations typically require at least two (and often three) inputs leads. For where input leads are scarce, the use of two to three leads may be difficult to accommodate. In other cases, the use of two or three input signals per power control IC may create complex routing problems between the ICs and their controlling entity.

For these reasons and others, there is a need for an interface that may be used to control stand-alone power and other IC types. Ideally, this interface would be able to accommodate a wide variety of control needs and be scaleable to many levels of complexity. Minimal pin use is also desirable, with the ideal being use of a single pin that may optionally be shared with another function.

SUMMARY OF THE INVENTION

The present invention includes a device control protocol (and related implementation) that may be used to control power ICs and other devices. For this protocol, a master device (such as a microprocessor) communicates with one or more slave devices (such as power control ICs) using a single wire. The protocol is bidirectional, meaning that information may travel from master to slave or from slave to master. The protocol also supports two types of addressing. The first type of addressing allows the master device to access separate addresses (such as different registers) within each slave device. The second type of addressing allows the master to select between different slave devices. The single wire that interconnects the master and slave devices is used to transmit a signal referred to as the EN/SET signal. The master and slave devices exchange information by toggling the voltage level of the EN/SET signal. Each rising edge of the EN/SET signal is counted by the receiving device to form a total. Tor example, to send the number five, the sending device toggles the EN/SET signal to produce five rising edges. The receiving device counts these rising edges to reconstruct the number five. The use of the EN/SET signal is described in more detail in the U.S. patent application Ser. No. 10/144,333 the disclosure of which is incorporated in this document by reference. It should also be appreciated that there may be other communications methods that can be used to transmit information between the master and slave devices.

The device control protocol distinguishes between different types of information (such as register address information and register content information) by defining one or more boundary values. For one example, register content information is defined to be less than or equal to n (where n is application dependent). Register address information is defined to be more than n. Additional boundaries can be defined to extend this scheme to an arbitrary degree.

To store data into a register of a slave device, a master device sends the register address using more than n rising edges of the EN/SET signal. The master device then sends the register contents using n or less rising edges of the EN/SET signal. The slave device decodes the address information, selects the corresponding register and stores the register contents.

For bidirectional operation, slave devices are configured to recognize a predefined register address. A message that corresponds to the predefined address instructs the slave device to return the contents of a corresponding register. The slave device responds by controlling the EN/SET signal to encode and send the register contents.

The preceding paragraphs present a simplified summary of the invention in order to provide a basic understanding of some of its aspects. This summary is not an extensive overview of the invention and is intended neither to identify key or critical elements of the invention nor to delineate its scope. The primary purpose of this summary is to present some concepts of the invention in a simplified form as a prelude to the more detailed description that is presented later.

DETAILED DESCRIPTION OF THE PREFERRED EMBODIMENTS

The present invention includes a device control protocol (and related implementation) that may be used to control power ICs and other devices. To simplify this description, it is convenient to assume that the device control protocol is being used in the type of environment shown in FIG. 1. That environment includes a master device (such as a microprocessor) that communicates with a slave device (such as a power control IC) using a single wire (or other communications link). The slave device includes a series of registers. Each register has an associated address that is typically a small integer.

Figure 2:
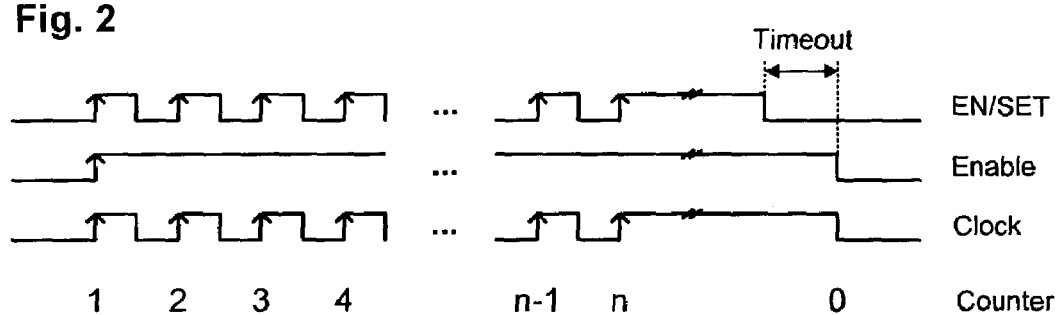
FIG. 2 is a timing diagram showing use of the EN/SET signal within the environment of FIG. 1.

The single wire that interconnects the master and slave device is used to transmit a signal referred to as the EN/SET signal. The master and slave device exchange information by toggling the voltage level of the EN/SET signal. As shown by the timing diagram of FIG. 2, the EN/SET signal may be characterized as having three different waveforms. The first of these is a toggling waveform where the EN/SET signal is composed of a series of clock pulses. The second waveform is where the EN/SET signal is asserted to have a constant high value. The third waveform is where the EN/SET signal is asserted to have a constant low value.

The toggling waveform is used to send information between the master and slave devices. A sending device (either master or slave) manipulates the EN/SET signal to produce the toggling waveform. The receiving device counts the rising edges to form a total. For example, to send the number five, the sending device toggles the EN/SET signal to produce five rising edges. The receiving device counts these rising edges to reconstruct the number five.

The constant low waveform is typically used to cause the slave device to reset. The constant high waveform is used at all other times (i.e., whenever the slave device is not being reset and information is not being transmitted). The use of the EN/SET signal is described in more detail in the U.S. patent application Ser. No. 10/144,333 the disclosure of which is incorporated in this document by reference. It should also be appreciated that there may be other communications methods that can be used to transmit information between the master and slave devices.

Use of the EN/SET signal provides a low-level mechanism for transporting information. The protocol provided by the present invention builds on this low level mechanism to support more sophisticated interactions between the master and slave devices. For this protocol, the information sent between the master and slave devices is classified into one or more types. The protocol distinguishes between different types of information by assigning a predefined upper and lower bound to each type. As an example, consider the case where two information types are used: type-one and type-two. Type-one information is defined to fall within the range of zero to an upper bound of n (i.e., $x:(0<x \leq n)$). Type-two information is defined to be greater than type-one information and has its own upper bound m (i.e., $x: (n<x \leq m)$). Additional information types may be defined in an analogous way (e.g., type-three information where $x:(m<x \leq l)$). The information types form a hierarchy. Each level of the hierarchy is distinguished by having values that are greater than the value included in the immediately preceding level.

Figure 1:
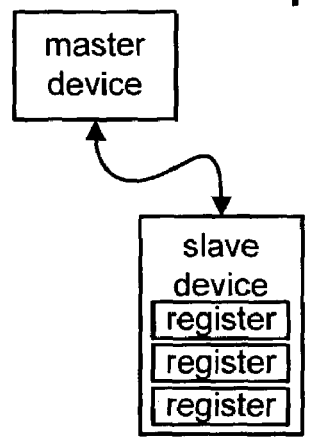
FIG. 1 is a block diagram showing a representative environment for deployment of the device control protocol provided by the present invention.

In environments like the one shown in FIG. 1, the device control protocol uses a hierarchy of two information types. The lowest level of this hierarchy (type-one information) is used to represent register contents. The next level of the hierarchy (type-two information) is used to represent register addresses. To define the contents of a particular register, the master device uses the EN/SET signal to transmit the address of the targeted register followed by the contents for that register. The register addresses is encoded as type-two information. This is generally performed by increasing the register address beyond the range occupied by type-one information. The master device then uses the EN/SET signal to transmit the contents of the targeted register. This information is encoded as type-one information. Since type-one information is at the lowest hierarchical level, it is transmitted without numerical manipulation.

Figure 3:
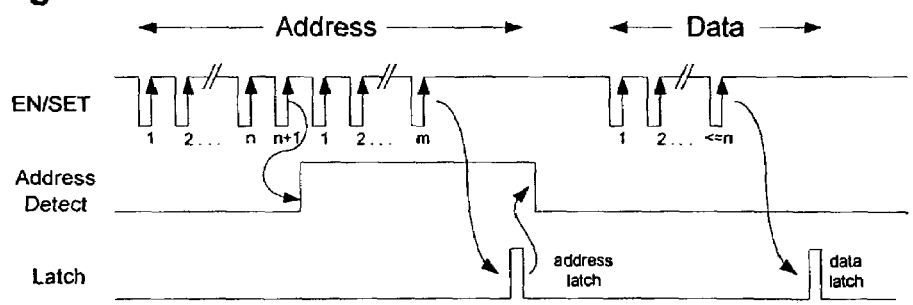
FIG. 3 is a timing diagram showing the device control protocol during a register write operation.

FIG. 3 shows how the slave device reacts to the EN/SET signal. Each rising edge is counted by the slave device. As the number of rising edges exceeds n, it is no longer possible that the information being received is type-one information. As a result, the slave device detects that type-two information (a register address) is being received. When the sequence of rising edges terminates, the slave device uses the total count of rising edges to form a register address. Since the type-two information was numerically increased when encoded by the master device, it will typically have to be decreased to form the register address. The slave device then selects an internal register that corresponds to the register address and applies the register content information.

Figure 4:
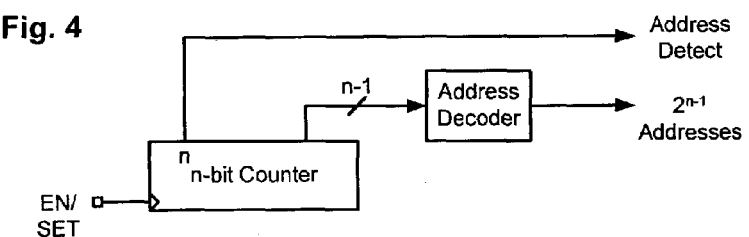
FIG. 4 is a block diagram of a circuit configured to distinguish between addresses and content information within the device control protocol.

In general, any number may be used to define the boundary between two information types. In practice it is generally more efficient to choose a number that is one less than an even power of two. For example, type-one information may be defined to fall within the range of $x:(0<x\leq2^n-1)$ and type-two information may be defined to fall within the range of $x:(2^n-1<x\leq2^{n+1})$. Choosing the boundary in this way means that the $n^{th}$ bit of a counter receiving the EN/SET signal indicates whether received information is type-one or type-two. This is shown in FIG. 4 where a counter receives an incoming EN/SET signal. The $n^{th}$ counter bit drives an address detect signal indicating that register address information is being received. When that signal is asserted, the received register address is available as the outputs of an address decoder driven by the least significant n−1 bits of the counter.

Figure 5:
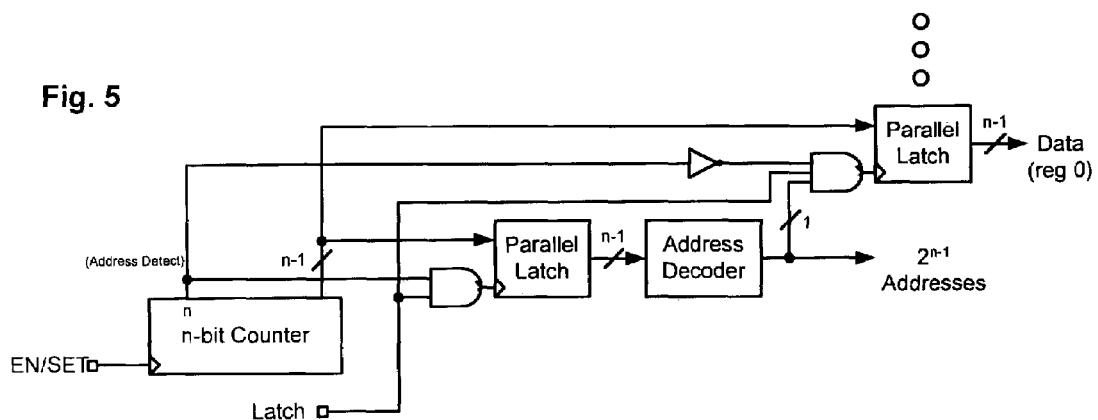
FIG. 5 is a block diagram of a circuit configured to implement the register write operation originally shown in FIG. 3.

FIG. 5 continues this example by showing an n bit counter configured to decode incoming register address and register content information. As shown in FIG. 4, rising edges of the EN/SET are accumulated in the n bit counter. The $n^{th}$ counter bit along with a latch signal drives an address detect signal indicating that register address information is being received. The latch signal indicates that the EN/SET signal has ceased to toggle-meaning that the contents of the counter are ready. When the latch signal is asserted, and the $n^{th}$ counter bit is set, the contents of the counter are stored in an n−1 bit parallel address latch. The output of the address latch is used to drive an address decoder. When the latch signal is asserted and the $n^{th}$ counter bit is not set, the contents of the counter are stored in one of a set of parallel data latches (only a single data latch is shown in FIG. 5). The particular data latch selected is chosen by the address stored in the address latch. Each data latch corresponds to one of the registers in the receiving device. In this way, register address information selects the register in which the register content information is stored.

A useful extension to the device control protocol is to allow multiple write operations to be performed using a single register address. For this type of implementation, a register address (type-two information) can be followed by a sequence of packets of register content information (type-one information). The slave device stores the first packet in the series in an internal register that corresponds to the register address. The slave device then increments the address and stores the next packet. This continues until a new register address is received.

Up to this point, the description has focused on a two level hierarchy of register address information and register content information. For many implementations, a useful extension is to add a third level that allows selection between multiple slave devices. For this implementation, there are multiple slave devices, each having one or more addressable registers. Each slave device is assigned an address (typically a small integer value). Type-three information is used to represent the addresses of slave devices. The master device encodes and sends the address of its intended target device before sending register address or register content information. All slave devices monitor the EN/SET signal. The selected target device recognizes its device address and processes the information that follows in way that is analogous to the case where only a single slave device is used. The non-targeted slave devices ignore the contents of the EN/SET signal until they are selected by the master device.

Figure 6:
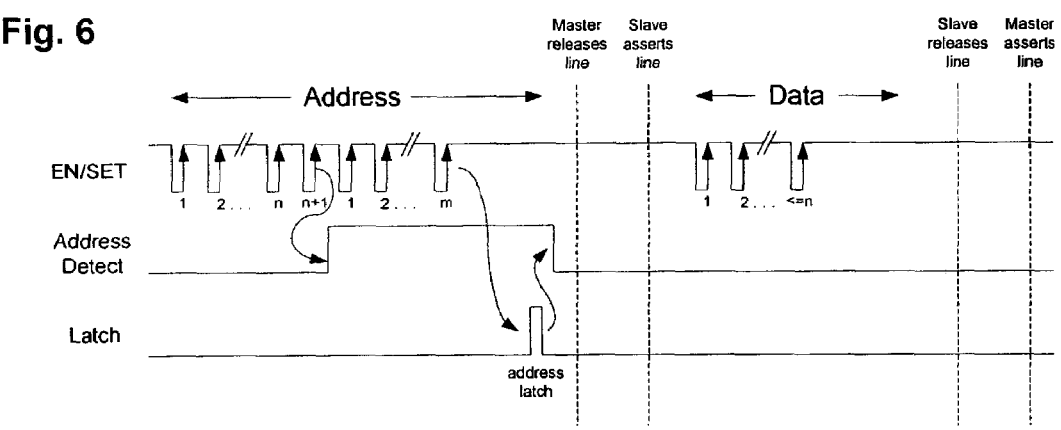
FIG. 6 is a timing diagram showing the device control protocol during a register read operation.

For many implementations, it is useful to configure the master and slave devices to support bidirectional communication. This can be used, for example in cases where the master device needs to know the contents of a register within a slave device. To support bidirectional communication, it is possible to configure the slave device to recognize a predefined read address. When the slave device receives a register address, it is compared to the read address. If there is a match, the slave device assumes control of the EN/SET signal and returns the requested information. An example of bidirectional communication is shown in FIG. 6. As shown, the master device initially controls the EN/SET signal to transmit a register address. Once transmission is complete, the master device releases control of the EN/SET signal. The slave device recognizes the received register address as being the predefined read address. The slave device responds by controlling the EN/SET signal to transmit the requested information. At the completion of transmission, the slave device relinquishes control of the EN/SET signal.

The use of the predefined read address may be extended so that multiple read addresses are predefined. This allows individual registers within each slave device to be read by the master device. This can be implemented in an orthogonal fashion doubling the size of the information type associated with register addressing to provide a read address and a write address for each register. Another possibility is to define an additional information type to designate operations as either read operations or write operations.

Figure 7:
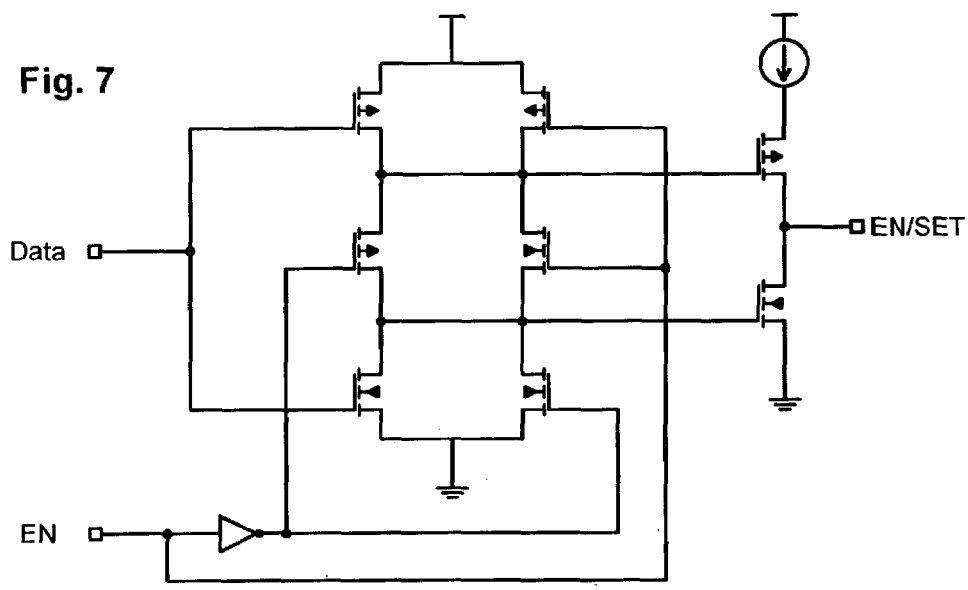
FIG. 7 is a block diagram of a circuit configured to allow a slave device to the EN/SET signal during the register read operation originally shown in FIG. 6.

To perform bidirectional communication using a single wire, it is important to account for the differences in supply voltage between master and slave devices. This is especially true when the slave device is a power control IC since the supply voltage of these devices exceeds that of typical master devices. FIG. 7 shows a slave read back circuit designed to accommodate level shifting due to different supply voltages on master and slave devices. To accomplish this, the circuit of FIG. 7 uses a current source controlled by a series of switches. The switches are controlled by an EN signal, and a data signal. When the EN signal is asserted, the read back circuit either drives the EN/SET signal with the current source or to ground. The choice between current source and ground is dictated by the state of the data signal. When the EN signal is not asserted, the read back circuit is effectively isolated from the EN/SET signal (i.e., both the current source and ground are disconnected). This allows another device, such as another slave or master device, to drive the EN/SET without conflict.

Figure 8:
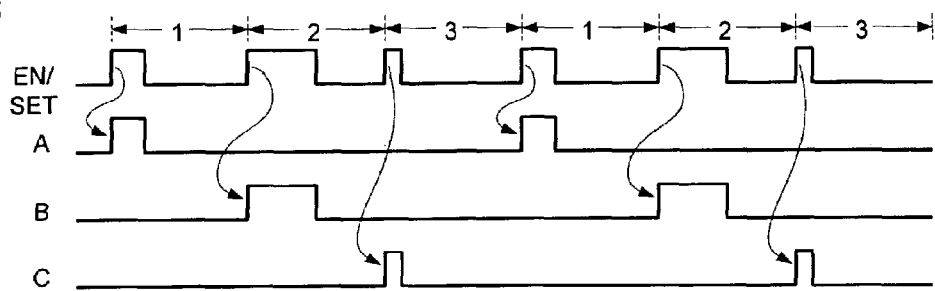
FIG. 8 is a timing diagram showing three signals multiplexed within the EN/SET signal.
Figure 9:
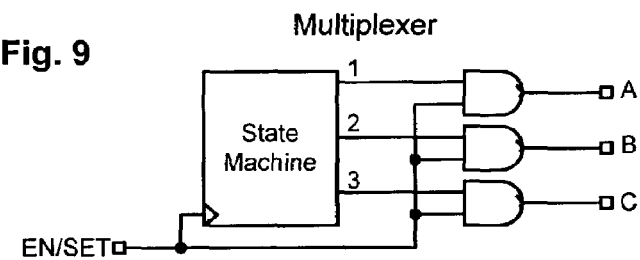
FIG. 9 is a block diagram of a state machine configured to decode the multiplexed signal originally shown in FIG. 8.

Multiplexing is another technique for enhancing the usefulness of the EN/SET signal. Multiplexing allows two or more signals to be interleaved in time and transmitted over the same wire. FIG. 8 shows three signals (1, 2 and 3) multiplexed within the same EN/SET signal. Each of the three signals is composed of a series of rising edges terminated by a period in which the EN/SET signal is held high. The pattern of signals repeats 1, 2, 3, 1, 2 . . . A slave device is configured to operate synchronously with the pattern of repeating signals. As shown in FIG. 9, this can be accomplishing using a state machine to gate the EN/SET signal. The state machine enables and disables three gates in a repeating pattern that matches the pattern of the EN/SET signal. As a result, the information included in the first signal is routed through the first gate while the information in the second and third signals is routed through the second and third gates, respectively. This method is easily scaled to any number of multiplexed signals.

Figure 10:
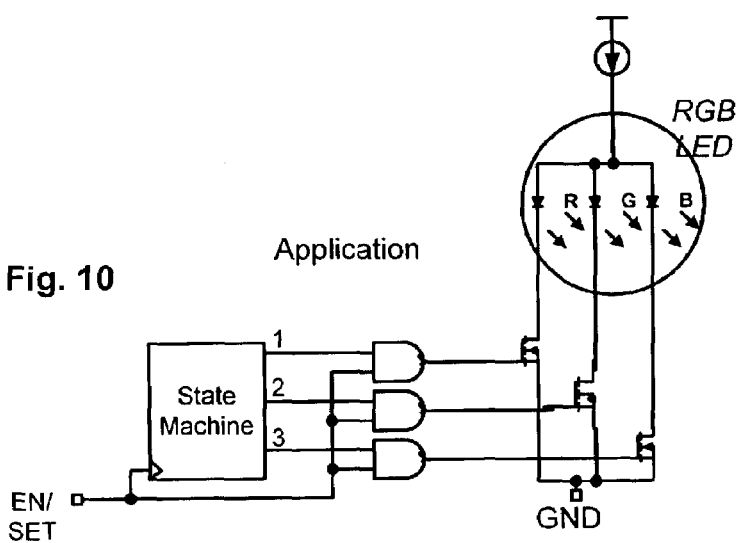
FIG. 10 is a block diagram of a color LED driven using the multiplexed signal originally shown in FIG. 8.

FIG. 10 shows a color LED driven by the state machine of FIG. 9. The LED includes separate elements for red, green and blue. To obtain a given color, a master device controls the EN/SET signal to produce the pattern of repeating signals shown in FIG. 8. By varying the number of rising edges included in each of the three multiplexed signals, the duty cycle for each of the LEDs can be separately controlled. This allows the overall color emitted by the LED to be controlled by the master device using a single wire.

The device control protocol described in the preceding sections may be used to implement a wide range of useful technologies. An example is the ubiquitous voltage detector where a voltage exceeding a given threshold is signified by a "1" and the same voltage not exceeding the given threshold is signified by a "0". Adding bidirectional communication to the EN/SET signal accommodates the reporting without adding additional pins to the voltage detector package.

A second example is a voltage regulator IC that drives the current sources that are used to power LED's for illumination. In modern phone handsets, there are at least two displays with LED lighting to control. In the clam shell design, there is a main display which is revealed when the clam shell is open, plus an auxiliary display on the outside of the clam shell that is always visible. Some phones now also include a camera that requires a flash which is also made up of LEDs. A single charge pump can easily power the three groups of LEDs. By adding addressing to the EN/SET signal, the three groups can be controlled independently by setting the ON/OFF and brightness level of independent registers. In so doing external switches are removed from the system, and scarce processor I/O ports are minimized to a single port.

Another example is an IC used to control the power of a Universal Serial Bus (USB) On The Go (OTG) main VBUS power line. This IC has several modes of operation to power the VBUS, for instance, a current source is applied to VBUS which can be used as a timer to gauge the amount of capacitance on VBUS. When a host device is active, a charge pump is activated to apply a regulated voltage to VBUS. In addition, there is a power down state, plus a state where VBUS is discharged through a resistor. These four states can be easily implemented with the single wire serial interface rather than a two bit parallel interface. The USBOTG IC monitors VBUS with four voltage monitors which signal whether or not VBUS is active, or within regulation. Rather than use four output pins, these four status bits can be reported over a single wire serial interface by momentarily allowing slave to act as host.

What is claimed is:

1. A protocol for communications in a single wire network, the protocol comprising:
    a register address packet encoded using a number of clock pulses that exceeds a first predefined boundary, the register address packet being stored by a slave device as a register address, where the register address packet is terminated by a period in which the single wire network is asserted in a predefined logical condition for a time that exceeds a predetermined timeout value; and
    a register data packet encoded using a number of clock pulses that is less than or equal to the first predefined boundary, the register data packet being stored by the slave device in a target register where the address of target register is calculated using the last register address stored by the slave device.

2. A protocol as recited in claim 1, wherein the predefined boundary value can be expressed using the form: $2^n-1$ where n is a positive integer.

3. A protocol as recited in claim 1, wherein each register address packet may be followed by a sequence of register data packets with the slave device incrementing the address of the target register for each successive register data packet.

4. A protocol as recited in claim 1 which further comprises:
    a device address packet encoded using a number of clock pulses that exceeds a second predefined boundary, the device address packet causing the slave device:
    enable processing of information packets if the device address packet that matches the device address of the slave device; and
    disable processing of information packets if the device address packet fails to match the device address of the slave device.

5. A protocol as recited in claim 4, wherein the device address packet is terminated by a period in which the single wire network is asserted in a predefined logical condition for a time that exceeds a predetermined timeout value.

6. A protocol as recited in claim 1, wherein the first predefined boundary value can be expressed using the form: $2^n-1$ where n is a positive integer and wherein the second predefined boundary value can be expressed using the form: $2^m-1$ where m is a positive integer and wherein m>n.

7. A protocol as recited in claim 1 which further comprises a register read packet being a predefined value encoded using a number of clock pulses that exceeds the first predefined boundary, the device address packet causing the slave device to return the contents of a target register to the master device.

8. A protocol as recited in claim 7, wherein the register read packet is terminated by a period in which the single wire network is asserted in a predefined logical condition for a time that exceeds a predetermined timeout value.

9. A method for controlling a device, the method comprising:
    toggling an input signal to the device to transmit a register address as a series of clock pulses where the number of clock pulses exceeds a first predefined boundary value;
    maintaining the input signal in a predefined logical state for a duration that exceeds a predefined timeout period; and
    toggling the input signal to the device to transmit register data as a series of clock pulses where the number of clock pulses is less than or equal to the first predefined boundary value; and
    returning the input signal to the predefined logical state for a duration that exceeds a predefined timeout period.

10. A method as recited in claim 9, wherein the predefined boundary value can be expressed using the form: $2^n-1$ where n is a positive integer.

11. A method as recited in claim 9 that further comprises the steps of:
    forming a first count of clock pulses in the input signal;
    detecting that a register address is being received when the first count exceeds the first predefined boundary value;
    detecting that the input signal has been asserted in a predefined logical condition for a time that exceeds the predetermined timeout value; and
    storing a register address based on the count of clock pulses.

12. A method as recited in claim 9 that further comprises the steps of:
    forming a second count of clock pulses in the input signal;
    detecting that the input signal has been asserted in a predefined logical condition for a time that exceeds the predetermined timeout value; and storing the second count of clock pulses at the last received register address.

13. A method as recited in claim 9 that further comprises the steps of:

toggling an input signal to the device to transmit a device address as a series of clock pulses where the number of clock pulses exceeds a second predefined boundary value; and maintaining the input signal in a predefined logical state for a duration that exceeds a predefined timeout period.

14. A method for controlling a device, the method comprising:

toggling an input signal to the device to transmit a predefined read address as a series of clock pulses;

maintaining the input signal in a predefined logical state for a duration that exceeds a predefined timeout period;

forming a count of clock pulses in the input signal;

detecting that the input signal has been asserted in a predefined logical condition for a time that exceeds a predetermined timeout value;

detecting that the count of clock pulses has indicated the receipt of a predefined register read address; and toggling the input signal to transmit the contents of a register corresponding to the register read address.

15. An interface for controlling a device, the interface comprising:

a counter for accumulating a count of clock pulses encoded in a received signal;

a register address latch;

a first circuit configured to cause a value based on the accumulated count of clock pulses to be stored in the register address latch when the count of clock pulses exceeds a predefined boundary value and when the input signal has been asserted in a predefined logical condition for a time that exceeds a predetermined timeout value; and a second circuit configured to cause the accumulated count of clock pulses to be stored in a register calculated using the contents of the register address latch, when the count of clock pulses does not exceed a predefined boundary value and when the input signal has been asserted in a predefined logical condition for a time that exceeds a predetermined timeout value.

16. An interface for controlling a device, the interface comprising:

a counter for accumulating a count of clock pulses encoded in a received signal;

a circuit configured to:

cause the accumulated count of clock pulses to be sent to a target destination when the input signal has been asserted in a predefined logical condition for a time that exceeds a predetermined timeout value, where the target destination is based on a currently selected state in a series of states; and select a new currently selected state.

* * * * *